(12) United States Patent
Sasaki et al.

(10) Patent No.: US 9,274,292 B2
(45) Date of Patent: Mar. 1, 2016

(54) SIGNAL TRANSMITTING CONNECTOR, CABLE HAVING THE SIGNAL TRANSMITTING CONNECTOR, DISPLAY APPARATUS HAVING THE CABLE, AND VIDEO SIGNAL OUTPUT APPARATUS

(71) Applicant: Panasonic Intellectual Property Management Co., Ltd., Osaka (JP)

(72) Inventors: Chie Sasaki, Osaka (JP); Tsutomu Niiho, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/406,659

(22) PCT Filed: Dec. 13, 2013

(86) PCT No.: PCT/JP2013/007349
§ 371 (c)(1),
(2) Date: Dec. 9, 2014

(87) PCT Pub. No.: WO2014/103229
PCT Pub. Date: Jul. 3, 2014

(65) Prior Publication Data
US 2015/0153521 A1    Jun. 4, 2015

(30) Foreign Application Priority Data

Dec. 27, 2012  (JP) ................................ 2012-284777

(51) Int. Cl.
*G02B 6/36* (2006.01)
*G02B 6/42* (2006.01)

(52) U.S. Cl.
CPC ............ *G02B 6/4214* (2013.01); *G02B 6/4204* (2013.01); *G02B 6/4284* (2013.01)

(58) Field of Classification Search
CPC ...... G02B 6/42; G02B 6/4214; G02B 6/4284; G02B 6/4246; G02B 6/4292; G02B 6/4201; G02B 6/3604; G02B 6/26; G02B 6/35
See application file for complete search history.

(56) References Cited

U.S. PATENT DOCUMENTS 5,347,387 A * 9/1994 Rice .............................. 398/129
5,515,468 A   5/1996 DeAndrea et al.
(Continued)

FOREIGN PATENT DOCUMENTS

JP   H04-308804 A   10/1992
JP   H06-273641 A    9/1994
(Continued)

OTHER PUBLICATIONS

International Search Report for corresponding International Application No. PCT/JP2013/007349 (English Translation) dated Mar. 11, 2014.
(Continued)

*Primary Examiner* — Ryan Lepisto
*Assistant Examiner* — Guy Anderson
(74) *Attorney, Agent, or Firm* — Renner, Otto, Boisselle & Sklar, LLP

(57) ABSTRACT

A signal transmitting connector of the present disclosure includes a connection terminal portion comprising a terminal that executes at least one of outputting of an electric signal to an external device or inputting of the electric signal from an external device, a connector portion comprising a photoelectric converting portion that executes photoelectric conversion between an optical signal and the electric signal, and a cable holding portion that holds an optical fiber transmitting the optical signal, the cable holding portion comprising one or a plurality of cable holding portion mirror(s) each forming an optical path between the optical fiber and the photoelectric converting portion.

16 Claims, 10 Drawing Sheets

(56) References Cited

U.S. PATENT DOCUMENTS

| | | | |
|---|---|---|---|
| 5,588,077 A * | 12/1996 | Woodside | 385/26 |
| 5,708,743 A | 1/1998 | DeAndrea et al. | |
| 2004/0158662 A1 | 8/2004 | Konda et al. | |
| 2006/0067690 A1 | 3/2006 | Tatum et al. | |
| 2006/0077778 A1 * | 4/2006 | Tatum et al. | 369/44.11 |
| 2007/0183709 A1 | 8/2007 | Furuno et al. | |
| 2007/0237463 A1 * | 10/2007 | Aronson | 385/89 |
| 2009/0248041 A1 * | 10/2009 | Williams et al. | 606/130 |
| 2010/0044103 A1 * | 2/2010 | Moxley et al. | 175/16 |
| 2010/0297889 A1 | 11/2010 | Teramoto | |
| 2011/0108716 A1 | 5/2011 | Shiraishi | |
| 2011/0115882 A1 * | 5/2011 | Shahinian et al. | 348/45 |
| 2012/0027364 A1 * | 2/2012 | Tamura et al. | 385/92 |
| 2012/0134622 A1 * | 5/2012 | Davis | 385/26 |
| 2013/0223798 A1 * | 8/2013 | Jenner et al. | 385/77 |
| 2013/0345510 A1 * | 12/2013 | Hadani | 600/113 |
| 2014/0099061 A1 * | 4/2014 | Isenhour et al. | 385/79 |
| 2014/0142436 A1 * | 5/2014 | Hutchins et al. | 600/478 |
| 2015/0071590 A1 * | 3/2015 | Wu et al. | 385/56 |

FOREIGN PATENT DOCUMENTS

| | | |
|---|---|---|
| JP | 2002-076374 A | 3/2002 |
| JP | 2004-241361 A | 8/2004 |
| JP | 2007-241200 A | 9/2007 |
| JP | 2008-515343 A | 5/2008 |
| JP | 3154848 U | 10/2009 |
| JP | 3155573 U | 10/2009 |
| JP | 2010-272485 A | 12/2010 |
| JP | 2011-107206 A | 6/2011 |
| JP | 2012-168443 A | 9/2012 |

OTHER PUBLICATIONS

International Preliminary Report on Patentability for corresponding International Application No. PCT/JP2013/007349 mailed Jul. 9, 2015. English translation.

* cited by examiner

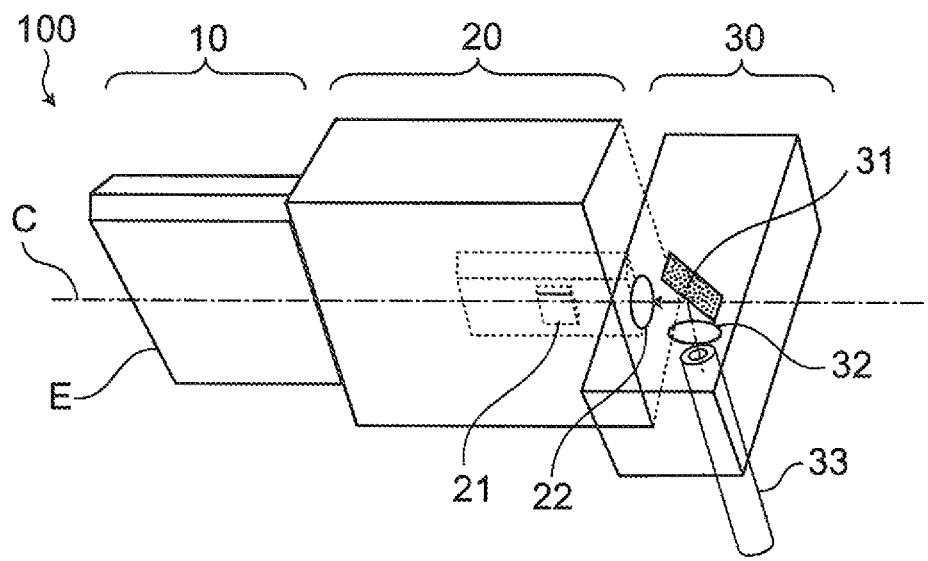
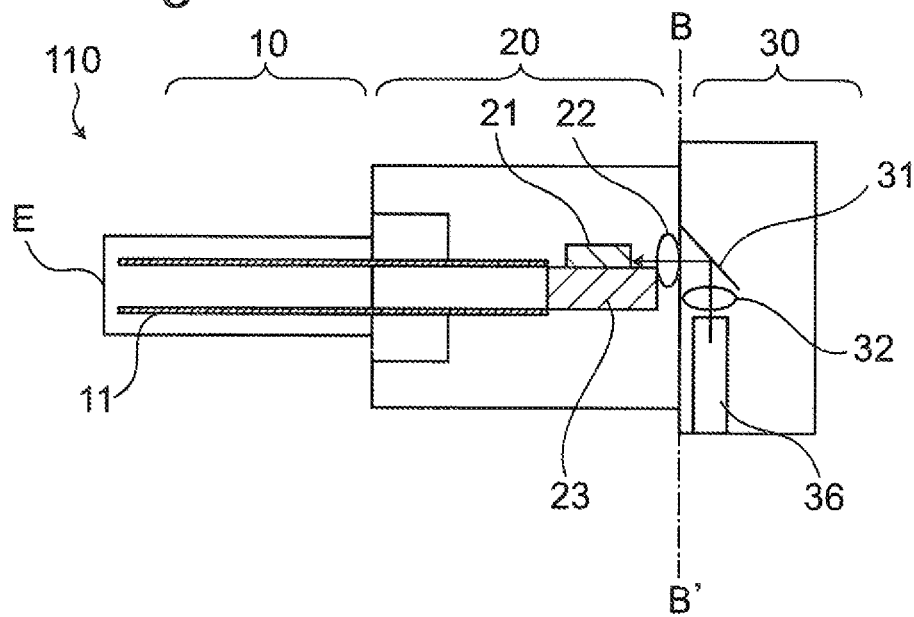

TRANSMIT : RECEIVE
Ch2 → Ch0
Ch3 → Ch1
Ch0 → Ch2
Ch1 → Ch3

TRANSMIT : RECEIVE
Ch0 → Ch0
Ch1 → Ch1
Ch2 → Ch2
Ch3 → Ch3

SIGNAL TRANSMITTING CONNECTOR, CABLE HAVING THE SIGNAL TRANSMITTING CONNECTOR, DISPLAY APPARATUS HAVING THE CABLE, AND VIDEO SIGNAL OUTPUT APPARATUS

DESCRIPTION OF THE RELATED ART

The present disclosure relates to a signal transmitting connector, a cable having the connector, a display apparatus having the cable, and a video signal output apparatus.

The complete transition to digital terrestrial transmission was executed in July 2011 and, in turn, the prevalence rate of thin-screen TVs in the ordinary households has rapidly grown. Types of the recent thin-screen TV also include many of those characterized to be "thin and light", and the use application has been prevailing for the thin-screen TV to be mounted on the wall and watched.

When a thin-screen TV is mounted on the wall and is used, a desire is present to wire the cables used to connect the TV to a Blu-ray disc recorder and/or a game machine in a low-profile manner and with a nice appearance. An HDMI (High-Definition Multimedia Interface) cable capable of transmitting high definition video data and audio data by one cable is often used as the cable connecting these apparatuses and the thin-screen TV.

CITATION LIST

Patent Documents

[Patent Document 1] Japanese Utility Model Registration Publication No. 3154848

SUMMARY

The thin-screen TV includes at least one HDMI terminal. However, the position of the terminal differs by the manufacturer and/or the model, and some thin-screen TVs each have the terminal disposed on its back surface or its side face. Especially, when a thin-screen TV having the HDMI terminal disposed on its back surface is mounted on the wall and is used, a space is desirable between the back surface of the thin-screen TV and the wall to connect the thin-screen TV and an external device through the HDMI cable. When the cable is forcibly bent to reduce this space, not only the appearance thereof is degraded but also this leads to breakage of the cable.

Based on the above in the background, a configuration has been proposed according to which the cable can be bent at 90 degrees in order to effectively utilize the space in the vicinity of a terminal unit of the cable, and an attachment to enhance the design property of the wiring form of a cable holding portion in a connector is attached to the connector (see, e.g., Patent Document 1).

However, according to the conventional cable configuration including a copper wire as a transmission line, the size of the connector is limited by the bend radius resulting from the thickness of the copper wire in the cable. Therefore, especially, when the thin-screen TV having the terminal on its back surface is mounted on the wall and is used, a space having a certain size is desirable between the back surface of the thin-screen TV and the wall due to the connector to connect the cable and the thin-screen TV. Therefore, a problem arises that the space cannot be reduced.

The present disclosure solves the conventional problem, and one non-limiting and exemplary embodiment provides a signal transmitting connector, a cable having the connector, a display apparatus having the cable, and a video signal output apparatus each capable of reducing the space between the apparatus and the wall, etc.

In one general aspect, a signal transmitting connector includes:
a connection terminal portion comprising a terminal that executes at least one of outputting of an electric signal to an external device or inputting of the electric signal from an external device;
a connector portion comprising a photoelectric converting portion that executes photoelectric conversion between an optical signal and the electric signal; and
a cable holding portion that holds an optical fiber transmitting the optical signal, the cable holding portion comprising one or a plurality of cable holding portion mirror(s) each forming an optical path between the optical fiber and the photoelectric converting portion.

In one general aspect, a cable includes:
an optical fiber; and
at least the one signal transmitting connector according to the aspect of the present disclosure disposed on an end of the optical fiber.

In one general aspect, a display apparatus includes:
a displaying portion that displays a video image;
a connection terminal to input thereinto an electric signal comprising a video signal; and
the cable according to the aspect of the present disclosure comprising the signal transmitting connector connected to the connection terminal.

In one general aspect, a video signal output apparatus includes:
a video signal generating portion that produces an electric signal comprising a video signal;
a connection terminal that outputs the electric signal from the video signal generating portion; and
a cable comprising an optical fiber, wherein
in the cable, the optical fiber has one end provided with at least the one signal transmitting connector according to the aspect of the present disclosure, and the optical fiber has the other end provided with a second signal transmitting connector comprising a second connection terminal portion connected to the connection terminal, and a second photoelectric converting portion converting an electric signal from the connection terminal into an optical signal and outputting the optical signal to the optical fiber.

According to the present disclosure, the space can be reduced between the apparatus and the wall, etc.

BRIEF DESCRIPTION OF THE DRAWINGS

FIG. 4 is a schematic perspective diagram of a structure acquired when a connector portion and a cable holding portion of a signal transmitting connector of a second embodiment according to the present disclosure, rotate against each other.

FIG. 5 is a schematic cross-sectional diagram of a structure of a signal transmitting connector of a third embodiment according to the present disclosure, including an optical fiber socket from which an optical fiber is detachable.

FIG. 14(*b*) is a positional relation diagram of a correspondence between the transmission channels and the receiving channels based on the training sequence according to the connector of the seventh embodiment according to the present disclosure.

DETAILED DESCRIPTION

Figure 1:
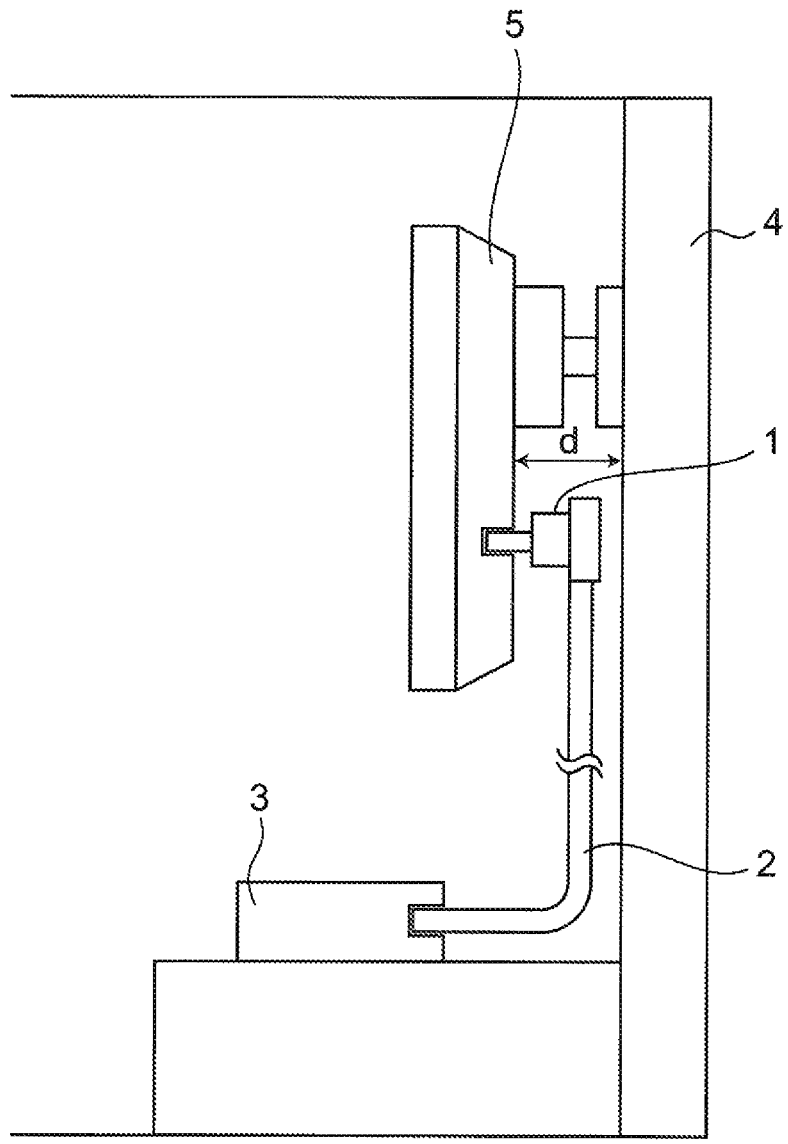
FIG. 1 is a schematic diagram for explaining exemplary use of a signal transmitting connector of a first embodiment according to the present disclosure.

A signal transmitting connector according to a first aspect of the present disclosure includes:

a connection terminal portion comprising a terminal that executes at least one of outputting of an electric signal to an external device or inputting of the electric signal from an external device;

a connector portion comprising a photoelectric converting portion that executes photoelectric conversion between an optical signal and the electric signal; and a cable holding portion that holds an optical fiber transmitting the optical signal, the cable holding portion comprising one or a plurality of cable holding portion mirror(s) each forming an optical path between the optical fiber and the photoelectric converting portion.

The signal transmitting connector of the first aspect according to the present disclosure configured as above can bend the optical path of the optical signal using the cable holding portion mirror(s) by employing the form of transmission by the optical signal. Therefore, the necessity to take into consideration the bend radius of the copper wire is avoided not like the conventional connector covering the bend portion of the cable using the copper wire and, therefore, the size of the signal transmitting connector can be reduced.

In a signal transmitting connector according to a second aspect of the present disclosure, the photoelectric converting portion in the first aspect converts the optical signal from the cable holding portion mirror into an electric signal, and the terminal outputs the electric signal to an external device.

According to this configuration, a signal receiving connector acquired by downsizing the signal transmitting connector can be realized.

In a signal transmitting connector according to a third aspect of the present disclosure, in the first or second aspect, the terminal inputs the electric signal from an external device, and the photoelectric converting portion converts the electric signal from the terminal into the electric signal.

According to this configuration, a signal transmitting connector acquired by downsizing the signal transmitting connector can be realized.

In a signal transmitting connector according to a fourth aspect of the present disclosure, the photoelectric converting portion in the third aspect includes an edge emitting laser.

According to this configuration, a desired optical signal can exit from an end surface (a side surface) of the photoelectric converting portion.

In a signal transmitting connector according to a fifth aspect of the present disclosure, the photoelectric converting portion in the third aspect includes a surface emitting laser.

According to this configuration, a desired optical signal can exit from a surface (a bottom surface) of the photoelectric converting portion, and a cost can be reduced.

In a signal transmitting connector according to a sixth aspect of the present disclosure, the connector portion in any one of the first to fifth aspects is rotatably connected to the cable holding portion, wherein the connector is rotated around a rotation center axis in parallel to an optical path between the connector portion and the cable holding portion.

According to this configuration, the connector portion can rotate around the rotation center axis.

In a signal transmitting connector according to a seventh aspect of the present disclosure, in the sixth aspect, the photoelectric converting portion includes a plurality of optical signal entering points, the one or the plurality of cable holding portion mirror(s) is/are disposed to face the plurality of optical signal entering points of the photoelectric converting portion, and intersection points of, a contact plane between the connector portion and the cable holding portion, and a plurality of optical paths between the optical signal entering points and the one or the plurality of cable holding portion mirror(s), are concentrically disposed centering the rotation center axis.

According to this configuration, the signal transmitting connector can be realized whose connector portion and cable holding portion can rotate against each other at a predetermined angle and the number of transmission lanes (the number of transmission paths) can easily be increased.

In a signal transmitting connector according to an eighth aspect of the present disclosure, the cable holding portion mirror in any one of the first to seventh aspects is configured to bend an optical path.

According to this configuration, even when an apparatus including a terminal in its back surface, for example, a thin-screen TV is mounted on the wall and is used, the space between the back surface of the thin-screen TV and the wall can be reduced by connecting the cable and the thin-screen TV using the connector.

In a signal transmitting connector according to a ninth aspect of the present disclosure, the connector portion in any one of the first to eighth aspects includes a connector portion lens in an optical path between the photoelectric converting portion and the cable holding portion mirror.

According to this configuration, the optical signal reflected by the cable holding portion mirror can securely be condensed on the photoelectric converting portion.

In a signal transmitting connector according to a tenth aspect of the present disclosure, the cable holding portion in any one of the first to ninth aspects includes an optical fiber socket from which the optical fiber is detachable.

According to this configuration, the optical fiber can easily be attached and detached, and a usable signal transmitting connector can be realized.

In a signal transmitting connector according to an eleventh aspect of the present disclosure, an end surface of the optical fiber in any one of the first to ninth aspects is provided with a reflecting surface inclined by 45 degrees relative to an optical axis in the optical path between the connector portion and the cable holding portion.

According to this configuration, the number of lenses can be reduced and the labor for disposing the lenses can be avoided. Therefore, reduction of the cost can be facilitated. Further reduction of the cost is enabled by forming a metal film as the reflecting surface on the end surface of the optical fiber.

In a signal transmitting connector according to a twelfth aspect of the present disclosure, the cable holding portion in any one of the first to eleventh aspects includes a cable holding portion lens in an optical path between the cable holding portion mirror and the optical fiber.

According to this configuration, the optical signal from the optical fiber can securely be condensed on the cable holding portion mirror.

In a signal transmitting connector according to a thirteenth aspect of the present disclosure, the cable holding portion in any one of the first to tenth aspects includes a cable holding portion optical waveguide that forms an optical path together with the cable holding portion mirror.

According to this configuration, alignment of the optical axis of the signal transmitting connector is facilitated and the workability is significantly improved.

In a signal transmitting connector according to a fourteenth aspect of the present disclosure, the optical path in any one of the first to tenth aspects between the photoelectric converting portion and the optical fiber is formed by a connector portion mirror, an optical waveguide, and the cable holding portion mirror.

According to this configuration, use of any lens is unnecessary by using the optical waveguide and the configuration to enable easy alignment of the optical axis can be realized. The space for disposing the lenses becomes unnecessary and, therefore, further downsizing of the connector can be realized.

In a signal transmitting connector according to a fifteenth aspect of the present disclosure, in any one of the first to fourteenth aspects, a cross-section surface perpendicular to a connection direction of the connection terminal portion has a non-circular shape.

According to this configuration, even when the connection terminal portion has a non-circular shape, a rotatable connector can be realized by rotating the signal transmitting connector.

A cable according to a sixteenth aspect of the present disclosure includes:

an optical fiber; and at least the one signal transmitting connector in any one of the first to fifteenth aspects disposed on an end of the optical fiber.

According to this configuration, the cable can be provided with the signal transmitting connector whose downsizing is realized.

In a display apparatus according to a seventeenth aspect of the present disclosure, a displaying portion that displays a video image;

a connection terminal to input thereinto an electric signal comprising a video signal; and the cable in the sixteenth aspect including the signal transmitting connector connected to the connection terminal.

According to this configuration, the display apparatus can be realized that is bundled with the cable including the signal transmitting connector whose downsizing is realized. When the display apparatus including a connection terminal on its back surface, such as a thin-screen TV is disposed on the wall, the space can be reduced between the back surface of the thin-screen TV and the wall. The configuration is established that has the excellent design property avoiding any degradation of the appearance of the cable disposed between the back surface of the thin-screen TV and the wall and that avoids any excessive load on the cable.

A video signal output apparatus according to an eighteenth aspect of the present disclosure includes:

a video signal generating portion that produces an electric signal comprising a video signal;

a connection terminal that outputs the electric signal from the video signal generating portion; and a cable including an optical fiber, wherein in the cable, the optical fiber has one end provided with at least the one signal transmitting connector in any one of the first to fifteenth aspects, and the optical fiber has the other end provided with a second signal transmitting connector including a second connection terminal portion connected to the connection terminal, and a second photoelectric converting portion converting an electric signal from the connection terminal into an optical signal and outputting the optical signal to the optical fiber.

According to this configuration, the video image display apparatus can be realized that is bundled with the cable including the signal transmitting connector whose downsizing is realized.

The above schematic and specific aspects may be realized as an arbitrary aspect formed by combining the signal transmitting connector, the cable including the connector, the display apparatus, and the video signal output apparatus.

Embodiments according to the present disclosure will be described below with reference to the accompanying drawings. In all the drawings below, the same or corresponding parts are given the same reference numerals and will not again be described.

First Embodiment

FIG. 1 is a schematic diagram for explaining exemplary use of a signal transmitting connector of a first embodiment according to the present disclosure. FIG. 1 shows an example where a cable 2 including a signal transmitting connector 1 of a first embodiment (hereinafter, "connector 1") is used to connect a thin-screen TV 5 mounted on a wall 4 and a Blu-ray disc recorder 3 on a rack to each other. As shown in FIG. 1, when the connector 1 of the first embodiment is connected to a connection terminal (an HDMI terminal) disposed on the back surface of the thin-screen TV 5 to be a sink device, using the cable 2 including the connector 1 of the first embodiment, a space "d" can be reduced between the back surface of the thin-screen TV 5 and the wall 4. The connector 1 of the first embodiment is described below in detail.

Figure 2:
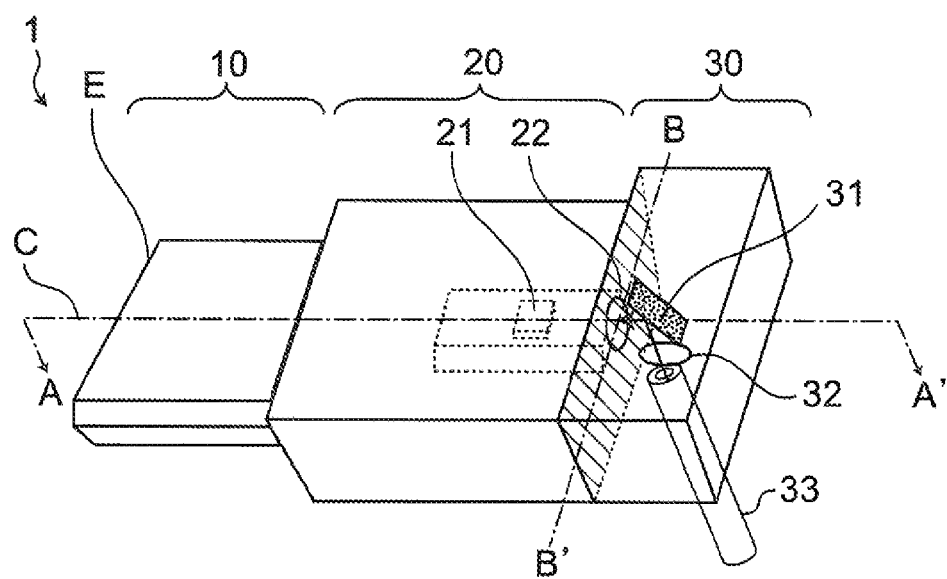
FIG. 2 is a schematic perspective diagram of a configuration of the signal transmitting connector of the first embodiment according to the present disclosure.
Figure 3:
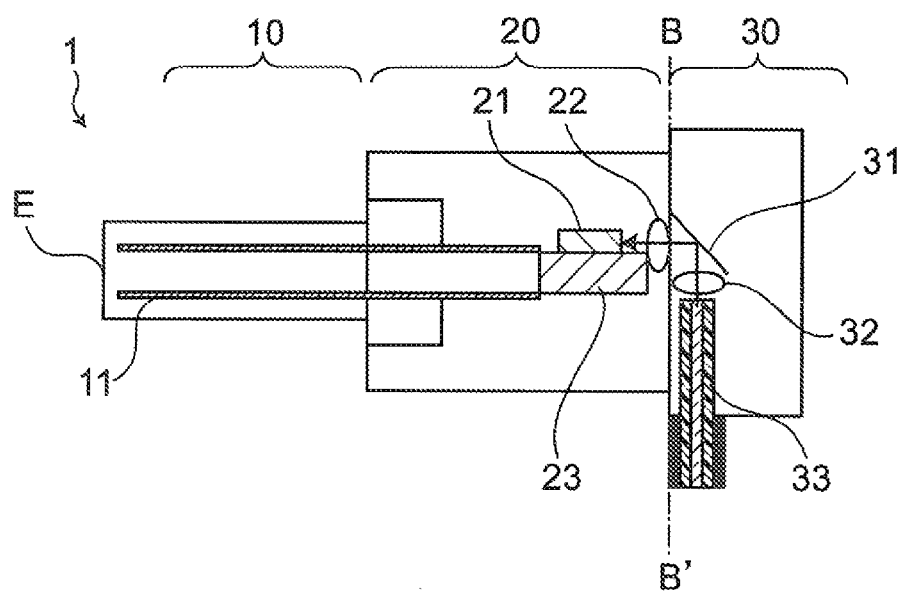
FIG. 3 is a cross-sectional diagram in a vertical plane including an A-A' line of FIG. 2.

FIG. 2 is a schematic perspective diagram of a configuration of the connector 1 of the first embodiment according to the present disclosure. FIG. 3 is a cross-sectional diagram in a vertical plane (an A-A' plane) including an A-A' line that is the center line of the connector of FIG. 2. Cross-sectional diagrams in embodiments below each show a cross-sectional diagram in the A-A' plane. The signal transmitting connector 1 of the first embodiment shown in FIGS. 2 and 3 (hereinafter, "connector 1") includes a cable holding portion 30, a connector portion 20, and a connection terminal portion 10. The connection terminal portion 10 includes a terminal 11 outputting an electric signal to an external device such as the thin-screen TV 5. The terminal 11 may be a terminal that does not output any electric signal to any external device but that is input with an electric signal from an external device such as the Blu-ray disc recorder 3. The terminal 11 may be a terminal that outputs an electric signal to an external device and that is input with an electric signal from an external device. The connector portion 20 includes a photoelectric converting portion 21 that executes photoelectric conversion between an electric signal and an optical signal. The connector portion 20 may include a connector portion lens 22 (hereinafter, "lens 22") that condenses the optical signal of the photoelectric converting portion 21. The connector portion 20 may include a connector portion substrate 23 (hereinafter, "substrate 23") to mount thereon the photoelectric converting portion 21, etc. The cable holding portion 30 is configured to hold an optical fiber 33 transmitting the optical signal, and includes a cable holding portion mirror 31 (hereinafter, "mirror 31") forming an optical path between the optical fiber 33 and the photoelectric converting portion 21. The cable holding portion 30 may include a cable holding portion lens 32 (hereinafter, "lens 32") that condenses the optical signal. The cable holding portion 30 may include plural cable holding portion mirrors that form optical paths between the optical fiber 33 and the photoelectric converting portion 21, instead of the one cable holding portion mirror 31. The optical fiber 33 may be fixed to the cable holding portion 30. The optical fiber 33 may detachably be connected to the cable holding portion 30. In the embodiments below, as an example, the description is made for the case where an external device such as the thin-screen TV 5 connected to the connector 1 receives a signal, that is, where: the optical signal exiting from the optical fiber 33 is input into the photoelectric converting portion 21; the photoelectric converting portion 21 converts the optical signal into the electric signal; and the electric signal is output from the terminal 11.

As shown in FIGS. 2 and 3, in the connector 1 of the first embodiment according to the present disclosure, the cable holding portion 30 holds the optical fiber 33 at a predetermined position. The optical signal exiting from the optical fiber 33 is condensed on the mirror 31 by the lens 32 and is reflected by the mirror 31 such that the optical path bends at 90 degrees. The optical signal whose optical path is changed by the mirror 31 is input into the photoelectric converting portion 21 through the lens 22 disposed in the connector portion 20. The photoelectric converting portion 21 converts the optical signal into the electric signal and outputs the electric signal to the terminal 11 disposed in the connection terminal portion 10 through the substrate 23. In this manner, the light flux from the optical fiber 33 is caused to securely converge on the photoelectric converting portion 21 by executing lens coupling using the lenses 22 and 32, and the mirror 31.

In the connector 1 of the first embodiment, the optical axis of the optical signal reflected by the mirror 31 is perpendicular to an end surface E of the connection terminal portion 10 (a surface facing the sink device). The optical signal exiting from the optical fiber 33 is reflected by the mirror 31 such that the optical path bends at 90 degrees, and is input into the photoelectric converting portion 21 to be perpendicular to the end surface E of the connection terminal 10. In the connector 1 of the first embodiment, the angle of the optical signal reflected by the mirror 31 is not limited to 90 degrees, and the optical signal can also be bent at an arbitrary angle such as 30 degrees or 60 degrees according to the disposition angle of the mirror 31. The case where the optical signal is reflected at 90 degrees will be described below in the description of the first embodiment.

Components configuring the connector 1 are described below.

<Terminal>

A terminal that is made of a phosphor bronze thin plate can be used as the terminal 11 of the terminal portion 10, for example. Phosphor bronze is characterized by its excellent spring property, abrasion resistance, and processibility, and is easily processed into an item having a complicated shape such as a connector. Anneal may be applied to the terminal 11 to provide the terminal 11 with functions such as fatigue endurance.

<Photoelectric Converting Portion>

An end surface injection type photodiode can be used as the photoelectric converting portion 21, for example. Thereby, the optical signal from the optical fiber 33 is input into the end surface injection type photodiode and is converted into the electric signal. The photoelectric converting portion 21 is mounted on the substrate 23 of the connector portion 20 using a flip chip method or a wire bonding method. The photoelectric converting portion 21 is physically connected to the substrate 23 through a connection portion such as a bonding wire or a bump. At this time, under-filling to be an infill may be formed around the photoelectric converting portion 21 and the connection portion. This under filling mitigates the stress and the strain applied to the connection portion between the photoelectric converting portion 21 and the connection portion, and, thereby, the reliability of the mounting can be enhanced.

When a signal is transmitted from an external device connected to the connector 1 of the first embodiment, an edge emitting semiconductor laser can be used as the photoelectric converting portion 21. The edge emitting semiconductor laser is configured to be able to emit a laser from its end surface (its side surface). In the first embodiment, the end surface of the edge emitting semiconductor laser emitting a laser is a surface in parallel to the end surface E of the connection terminal portion 10 that is a reference plane, and is configured to emit a laser in a direction perpendicular to the end surface E. When optical transmission whose transmission velocity is about 10 Gbps is executed, for example, a semiconductor laser whose oscillation frequency is 850 nm can be used as the semiconductor laser.

<Substrate>

A silicon substrate can be used as the substrate 23. The use of the silicon substrate enables, for example, reduction of the difference in the thermal expansion coefficient between the substrate 23 and the semiconductor laser. Therefore, the mounting reliability can be enhanced. A ceramic substrate, a glass epoxy substrate having a low thermal expansion coefficient, or a Teflon (a registered trademark) substrate excellent in a high frequency property may be used as the substrate 23.

<Lens>

According to the first embodiment, the lenses 22 and 32 as the condensing members are used respectively in the connector portion 20 and the cable holding portion 30. Micro lenses such as those made from silicon, a resin, or glass may be used as the lenses 22 and 32. The focal distances of the lens 22 and the lens 32 may differ from each other.

When the optical signal exiting from the optical fiber 33 is condensed in the center of the mirror 31 by the lens 32, to facilitate the optical axis alignment of the optical signal, the adjustment therefor may be executed such that the condensation region is expanded by shifting the focusing position back and forth to absorb the displacement of the optical axis. The same adjustment may be employed for the lens 22.

<Mirror>

As to the mirror 31, the mirror may be formed by a glass substrate having a reflecting film formed thereon, or a member formed by: processing a resin to which the lens 32 and the optical fiber 33 are fixed using cutting work or polishing; and forming a metal film on the surface of the resin. The angle of the mirror 31 is configured for the optical path of the optical signal exiting from the optical fiber 33 to bend at 90 degrees to be perpendicular to the reference plane E. Therefore, the mirror 31 is disposed at an inclination angle of 45 degrees relative to the optical axis in the optical path from the cable holding portion 30 to the connector portion 20 and perpendicular to the reference plane E.

<Optical Fiber>

The optical fiber 33 includes a core portion 33a present in the central portion thereof and a cladding portion 33b cladding the core portion 33a. For example, a core portion formed from quartz glass and having a diameter of $\phi 50$ µm is used as the core portion 33a in the central portion of the optical fiber 33. The core portion 33a is clad with the cladding portion 33b configured by quartz glass whose refractive index differs from that of the core portion 33a, and the cladding portion 33b having a diameter of, for example, $\phi 125$ µm or $\phi 250$ µm may be used.

As above, in the first embodiment according to the present disclosure, the employment of the form of executing the transmission using the optical signal enables the bend of the optical signal using the mirror 31. Therefore, the size of the connector can be set to be smaller than that of the connector covering the bend portion of the conventional cable that uses the copper wire. According to the conventional cable, at the portion bent at 90 degrees, the size of the connector is limited by the bend radius of the copper wire and, therefore, no downsizing of the connector portion can be facilitated. However, in the first embodiment, the use of the connector portion 20, the cable holding portion 30, and the optical fiber 33 avoids the limitation and, therefore, the downsizing of the connector portion can be realized. Thereby, for example, when the thin-screen TV to be the sink device including the terminal on its back surface is mounted on the wall and is used, the space can be reduced between the back surface of the thin-screen TV and the wall. No copper wire is used as the transmission path in the cable and, therefore, no problem arises such as degradation of the signal or disconnection of the copper wire due to the stress caused by the bend, and a highly reliable connector can be realized.

The optical fiber 33 includes the core portion 33a and the cladding portion 33b cladding the core portion 33a. The cladding portion 33b having the diameter of $\Phi 125$ µm is often used. In contrast, the diameter of the copper wire used in the conventional cable is large as compared to the diameter of the optical fiber 33 and, for example, as to the copper wire provided in AWG (American Wire Gauge) such as the one used in the HDMI cable, even "AWG No. 28" often used in relatively thin cables has a diameter of even $\Phi 320$ µm. "AWG No. 24" used in relatively thick cables has a diameter of $\Phi 510$ µm. As above, the diameter of the optical fiber 33 has a size smaller than or equal to a half of the diameter of AWG 28 that is the copper wire used in relatively thin cables as a result of a comparison therebetween. Therefore, in the first embodiment according to the present disclosure, the thickness of the cable holding portion 30 can be reduced and the overall connector 1 can be downsized.

The use of the lenses 22 and 32 enables the condensation of the optical signal on the photoelectric converting portion 21 or the mirror 31, etc., and, therefore, the connector 1 is configured to cause the light flux of the optical fiber 33 to securely converge on the photoelectric converting portion 21.

As above, according to the configuration of the connector 1 of the first embodiment according to the present disclosure, the size thereof can be reduced as compared to that of the conventional connector and, when the thin-screen TV including the terminal on its back surface is mounted on the wall and is used, the space can be reduced between the back surface of the thin-screen TV and the wall.

Second Embodiment

A signal transmitting connector of a second embodiment according to the present disclosure is described with reference to FIG. 4. FIG. 4 is a schematic perspective diagram of a structure of the signal transmitting connector of the second embodiment according to the present disclosure (hereinafter, "connector 100"). The connector 100 of the second embodiment is different from the connector 1 of the first embodiment in that the connector portion 20 and the cable holding portion 30 are connected to each other, rotatably against each other centering a rotation center axis C in parallel to the optical path between the connector portion 20 and the cable holding portion 30. The other configurations of the second embodiment are same as those of the first embodiment. FIG. 4 shows the state where the connector portion 20 and the cable holding portion 30 are rotated by 90 degree against each other centering the rotation center axis C from their state same as that of the connector 1 of the first embodiment shown in FIG. 2. The connector portion 20 and the cable holding portion 30 may be connected to each other to be able to hold their state where the connector portion 20 and the cable holding portion 30 are rotated against each other by 90 degrees, 180 degrees, 270 degrees, and 360 degrees (zero degree). The angle of the rotation is not limited to every 90 degrees, and the connector portion 20 and the cable holding portion 30 may be connected to each other to hold the state where the connector portion 20 and the cable holding portion 30 are rotated against each other by an arbitrary angle. The connector portion 20 and the cable holding portion 30 may be connected to each other to be freely rotatable against each other by 360 degree. The range of the angle by which the connector portion 20 and the cable holding portion 30 are rotatable against each other may be limited to a range smaller than 360 degrees. Either the connector portion 20 or the cable holding portion 30 may be rotated.

According to the second embodiment, similarly to the first embodiment, the optical signal exiting from the optical fiber 33 is condensed by the lens 32 on the mirror 31, and is reflected by the mirror 31 such that its optical path bends at 90 degrees. The optical signal whose optical path is changed by the mirror 31 is input into the photoelectric converting portion 21 through the lens 22 disposed in the connector portion 20. The photoelectric converting portion 21 converts the optical signal into an electric signal and outputs the electric signal to the terminal 11 disposed in the connection terminal portion 10.

In the second embodiment, for example, the connector 100 rotates around the rotation center axis C in a contact plane (a rotation plane B-B') between the connector portion 20 and the cable holding portion 30. The "rotation plane B-B" is a plane with hatching in FIG. 2. In the second embodiment, the optical axis of the optical signal reflected by the mirror 31 is perpendicular to the rotation plane B-B'. The optical signal exiting from the optical fiber 33 is reflected by the mirror 31 such that its optical path bends at 90 degrees, and is injected into the photoelectric converting portion 21 such that the optical axis of the reflected optical signal is perpendicular to the rotation plane B-B'. The optical axis of the optical signal matches with the rotation center axis C. Thereby, even when the connector portion 20 and the cable holding portion 30 rotate against each other, the optical path between the optical fiber 33 and the photoelectric converting portion 21 can be maintained.

The cross section perpendicular to the direction of the connection, of the connection terminal portion 10 may have a non-circular shape such as, a quadrilateral, a trapezoid, or an ellipse. The connector 100 in the second embodiment can rotate around the rotation center axis even when the connection terminal portion 10 has a non-circular shape. Therefore, the connector 100 is configured to be able to rotate the direction to lead out the cable at the connector 100 toward the terminal disposed on the thin-screen TV that is the sink device.

As above, according to the configuration of the connector 100 of the second embodiment according to the present disclosure, the connector portion 20 and the cable holding portion 30 are configured to be rotatable around the rotation center axis C.

Third Embodiment

A signal transmitting connector of a third embodiment according to the present disclosure is described with reference to FIG. 5. FIG. 5 is a schematic cross-sectional diagram of a configuration of the signal transmitting connector 110 of the third embodiment according to the present disclosure (hereinafter, "connector 110") including an optical fiber detachable optical fiber socket. In the third embodiment, the connector 110 differs from the connector 1 and the connector 100 in the first and the second embodiments in that the cable holding portion 30 includes the optical fiber socket 36 to/from which the optical fiber 33 can be attached/detached. The other configurations of the third embodiment are same as those in the first and the second embodiments.

As shown in FIG. 5, in the third embodiment, the cable holding portion 30 includes the optical fiber socket 36 to/from which the optical fiber 33 can be attached/detached. For example, a male portion is disposed on an end of the optical fiber 33 to be inserted into the optical fiber socket 36, and a female portion to/from which the male portion of the optical fiber 33 can be attached/detached is disposed on the optical fiber socket 36. According to this configuration, insertion of the male portion of the optical fiber 33 into the optical fiber socket 36 causes the female portion of the optical fiber socket 36 and the male portion of the optical fiber 33 to securely be engaged with each other and to be connected to each other allowing the signal transmission. Therefore, the connector 110 of the third embodiment is configured to easily attach/detach the optical fiber 33 to/from the cable holding portion 30 by including the optical fiber socket 36.

As above, according to the configuration of the connector 110 of the third embodiment according to the present disclosure, the connector 110 is configured to include the cable holding portion 30 to/from which the optical fiber 33 can easily be attached/detached and, therefore, the usable connector 110 can be realized.

Fourth Embodiment

Figure 6:
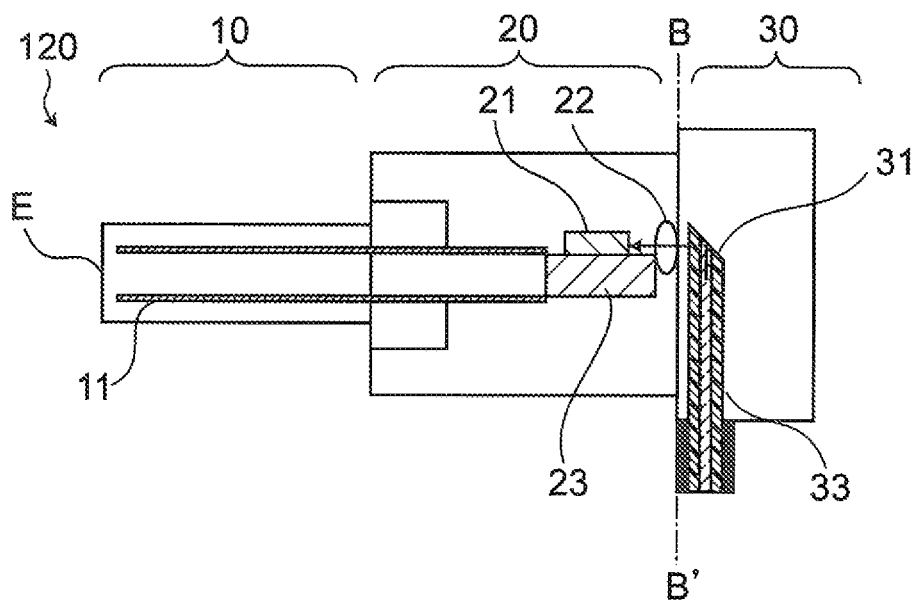
FIG. 6 is a schematic cross-sectional diagram of a configuration of a signal transmitting connector of a fourth embodiment according to the present disclosure.

A signal transmitting connector of a fourth embodiment according to the present disclosure is described with reference to FIG. 6. FIG. 6 is a schematic cross-sectional diagram of a structure of the signal transmitting connector 120 of a fourth embodiment according to the present disclosure (hereinafter, "connector 120"). The connector 120 differs from the connectors 1 and 100 in the first and the second embodiments in that a reflecting surface is formed that is inclined by 45 degrees relative to the optical axis of the optical path between the connector portion 20 and the cable holding portion 30, and the lens 32 is not used. In the fourth embodiment, the other configurations are same as those of the connectors 1 and 100 in the first and the second embodiments.

As shown in FIG. 6, in the fourth embodiment, the end surface of the optical fiber 33 forms a reflecting surface (the mirror 31) inclined by 45 degrees relative to the optical axis in the optical path between the connector portion 20 and the cable holding portion 30. Thereby, the optical signal exiting from the optical fiber 33 bends at 90 degrees on the reflecting surface, is transmitted through a side surface of the clad 33$b$ of the optical fiber 33, and enters the photoelectric converting portion 21 through the lens 22 of the connector portion 20. The photoelectric converting portion 21 converts the optical signal into an electric signal and outputs the electric signal to the terminal 11 disposed on the connection terminal portion 10.

As above, the end surface of the optical fiber 33 may be provided with the reflecting surface (the mirror 31) to reflect the optical signal. A metal film formed by sputtering or metal vapor deposition may be used as the reflecting surface disposed on the end surface of the optical fiber 33.

As above, according to the configuration of the fourth embodiment according to the present disclosure, the cable holding portion 30 is configured not to use the lens 32. Therefore, the number of lenses can be reduced and the labor for accurately disposing the lenses can be avoided. Therefore, the fourth embodiment is configured to be able to facilitate reduction of the cost. The fourth embodiment is configured to be able to further reduce the cost because the metal film is used as the reflecting surface on the end surface of the optical fiber 33.

Fifth Embodiment

Figure 7:
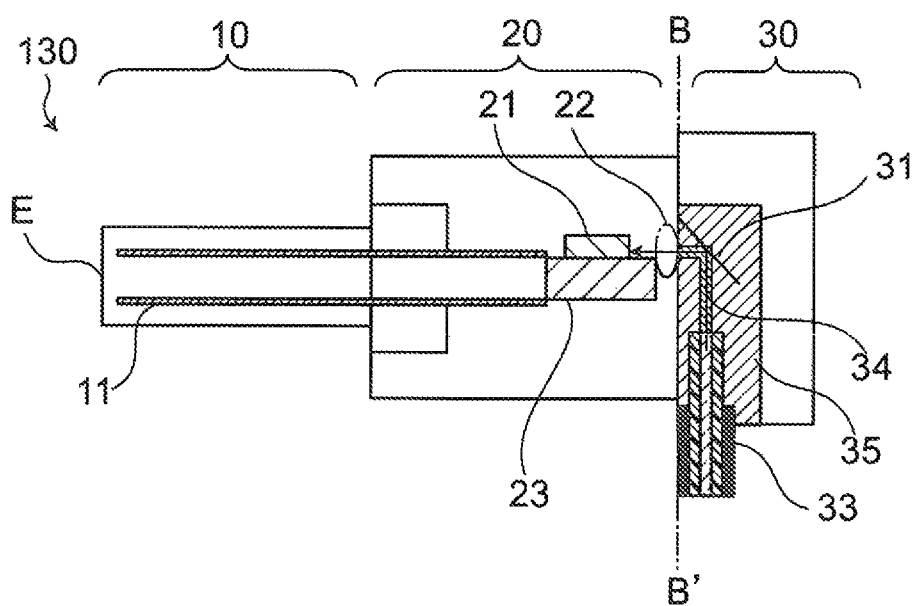
FIG. 7 is a schematic cross-sectional diagram of a configuration of a signal transmitting connector of a fifth embodiment according to the present disclosure.

A signal transmitting connector of a fifth embodiment according to the present disclosure is described with reference to FIG. 7. FIG. 7 is a schematic cross-sectional diagram of a structure of the signal transmitting connector 130 of the fifth embodiment (hereinafter, "connector 130"). The connector 130 differs from the connectors 1 and 100 in the first and the second embodiments in that the lens 22 and the optical fiber 33 are coupled with each other through a cable holding portion optical waveguide 34 (hereinafter, "optical wave guide 34") on a cable holding portion substrate 35 (hereinafter, "substrate 35"). Therefore, the cable holding portion lens 32 may be not disposed. In the fifth embodiment, the other configurations are same as the configurations of the connectors 1 and 100 in the first and the second embodiments.

As shown in FIG. 7, in the fifth embodiment, the optical signal exiting from the optical fiber 33 is reflected to be bent by the mirror 31 at 90 degrees through the optical waveguide 34 on the substrate 35. The reflected optical signal enters the photoelectric converting portion 21 through the lens 22. The photoelectric converting portion 21 converts the optical signal into an electric signal and outputs the electric signal to the terminal disposed on the connection terminal portion 10.

A silicon substrate may be used as the substrate 35. In the fifth embodiment, the mirror 31 may be formed on the silicon substrate. The high precision mirror 31 inclined by 45 degrees relative to the optical axis of the optical path between the connector portion 20 and the cable holding portion 30 can be formed by forming a high precision etched groove on the surface by utilizing the crystal orientation of silicon and utilizing the groove. The optical waveguide 34 can be formed on this groove.

As above, according to the configuration of the fifth embodiment according to the present disclosure, the lens 22 and the optical fiber 33 are coupled through the optical waveguide 34 and, therefore, the optical axis can easily be aligned and the workability is significantly improved.

Sixth Embodiment

Figure 8:
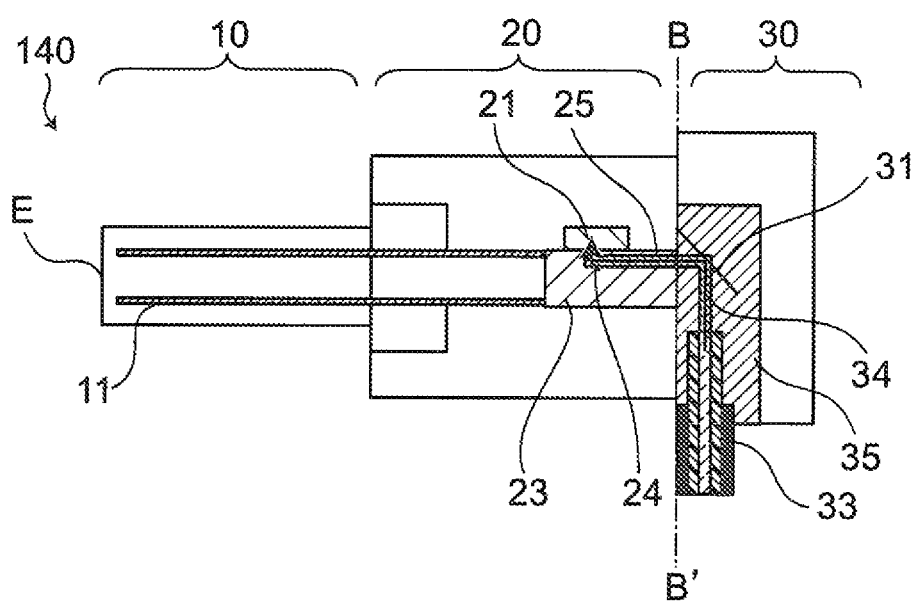
FIG. 8 is a schematic cross-sectional diagram of a configuration of a signal transmitting connector of a sixth embodiment according to the present disclosure.

A signal transmitting connector of a sixth embodiment according to the present disclosure is described with reference to FIG. 8. FIG. 8 is a schematic cross-sectional diagram of a structure of the signal transmitting connector 140 of the sixth embodiment (hereinafter, "connector 140"). The connector 140 differs from the connector 130 in the fifth embodiment in the direction of the optical signal input into the photoelectric converting portion 21. The sixth embodiment differs from the fifth embodiment in that the connector portion 20 includes a connector portion mirror 24 (hereinafter, "mirror 24") and a connector portion optical waveguide 25 (hereinafter, "optical waveguide 25"), and the lens 22 is not used in the connector portion 20. Similarly to the fifth embodiment, the lens 22 may be disposed instead of the optical waveguide 25. The other configurations are same as the configurations of the connector 130 in the fifth embodiment.

As shown in FIG. 8, in the connector 140 of the sixth embodiment, the optical signal exiting from the optical fiber 33 passes through the optical waveguide 34 of the cable holding portion 30 and is reflected by the mirror 31 such that its optical path bends at 90 degrees. The reflected optical signal passes through the optical waveguide 25 of the connector portion 20 and is input by the mirror 24 into a bottom surface of the photoelectric converting portion 21. The "bottom surface of the photoelectric converting portion 21" is a surface perpendicular to the end surface E of the connection terminal portion 10 that is the reference plane, and is a surface facing the substrate 23. The photoelectric converting portion 21 converts the optical signal into an electric signal and outputs the electric signal to the terminal 11 disposed on the connection terminal portion 10.

The inclination angles of the mirror 24 and the mirror 31 are each configured by, for example, 45 degrees relative to the optical axis in the optical path from the cable holding portion 30 to the connector portion 20.

A silicon substrate may be used as the substrate 23 of the connector portion 20 as above. The use of the silicon substrate enables the formation of the high precision mirror 24 at 45 degrees relative to the optical axis of the optical path from the cable holding portion 30 to the connector portion 20 by forming a high precision etched groove on the surface by utilizing the crystal orientation of silicon and utilizing the groove. The optical waveguide 25 can be formed on the groove.

A surface-receiving photodiode may be used as the photoelectric converting portion 21 in the sixth embodiment. When the signal is transmitted by the connector 140 of the sixth embodiment, a surface emitting semiconductor laser of a vertical cavity type called VCSEL (Vertical Cavity Surface Emitting Laser) emitting light in the vertical direction from its bottom surface may be used as the photoelectric converting portion 21. The surface emitting semiconductor laser has an advantage that its cost is lower than that of the edge emitting type semiconductor laser.

As above, according to the configuration of the sixth embodiment according to the present disclosure, the optical waveguide 34 is used in the fiber holding portion 30 and the optical waveguide 25 is used in the connector portion 20 and, thereby, the configuration can be realized of the connector 140 enabling easy alignment of the optical axis even without using any lens. Especially, this configuration is useful when the connector 140 is configured to be rotatable. The configuration of the sixth embodiment may not have a space for disposing any lens and, therefore, further downsizing of the connector can be realized.

Seventh Embodiment

Figure 9:
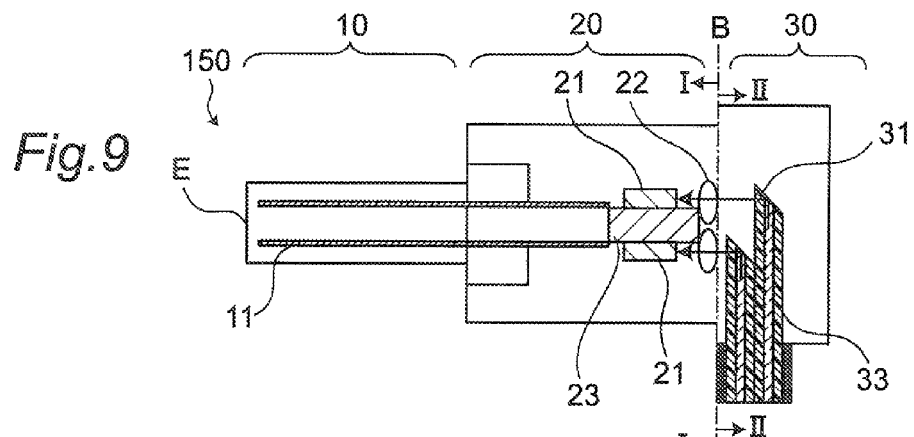
FIG. 9 is a schematic cross-sectional diagram of a configuration of a signal transmitting connector of a seventh embodiment according to the present disclosure.
Figure 10:
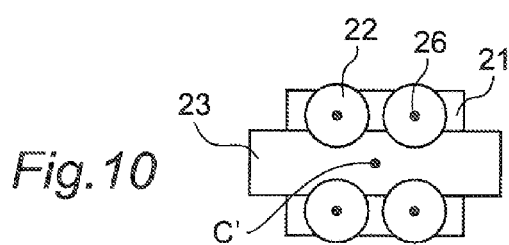
FIG. 10 is a schematic cross-sectional diagram taken from a direction indicated by an arrow I in a rotation plane B-B' of FIG. 9.
Figure 11:
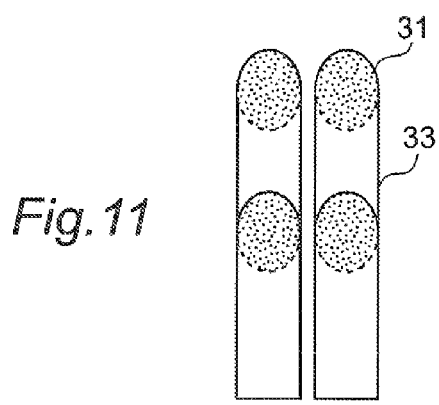
FIG. 11 is a schematic cross-sectional diagram taken from a direction indicated by an arrow II in the rotation plane B-B' of FIG. 9.
Figure 12:
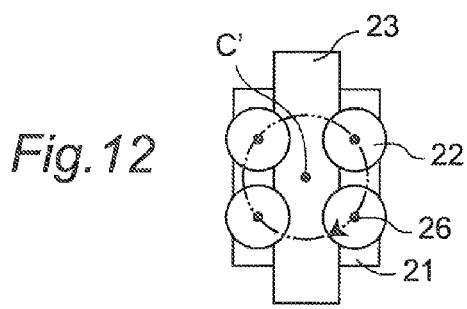
FIG. 12 is a schematic cross-sectional diagram, taken from the direction indicated by the arrow I in the rotation plane B-B' of FIG. 9, of a disposition of optical signal entering and exiting points and connector portion lenses.

A signal transmitting connector of a seventh embodiment according to the present disclosure is described with reference to FIGS. 9 to 12. FIG. 9 is a schematic cross-sectional diagram of a structure of a signal transmitting connector 150 of a seventh embodiment (hereinafter, "connector 150"). FIG. 10 is a schematic cross-sectional diagram taken from a direction indicated by an arrow "I" in a rotation plane B-B' of FIG. 9. FIG. 11 is a schematic cross-sectional diagram taken from a direction indicated by an arrow "II" in the rotation plane B-B' of FIG. 9. FIG. 12 is a schematic cross-sectional diagram, taken from the direction indicated by the arrow I in the rotation plane B-B' of FIG. 9, of the disposition of optical signal entering points and the lenses on the side of a connector portion acquired when the connector portion 20 is rotated (by 90 degrees). In FIGS. 9 to 12, the seventh embodiment differs from the second embodiment in that the plural photoelectric converting portions 21 and the plural lenses 22 are disposed in the connector portion 20, and the plural mirrors 31 and the plural optical fibers 33 are disposed in the cable holding portion 30. In the seventh embodiment, the other configurations are same as those of the connector configuration of the second embodiment.

As shown in FIG. 9, in the seventh embodiment, the photoelectric converting portion 21 is mounted on each of the front and the back surfaces of the substrate 23. "The front and the back surfaces of the substrate 23" are faces perpendicular to the rotation plane B-B'. FIGS. 9 to 12 show the case where the two photoelectric converting portions 21 are mounted on the front and the back surfaces of the substrate 23. However, the configuration of the seventh embodiment is not limited to this configuration, and an array product including plural signal entering points may also be used. In the seventh embodiment, as an example of the optical fiber 33, similarly to the end surface of the optical fiber 33 described in the fourth embodiment, the end surface is used that is inclined by 45 degrees relative to the optical axis in the optical path between the connector portion 20 and the cable holding portion 30.

As shown in FIG. 10, the connector portion 20 of the seventh embodiment has the four lenses 22 disposed in the vicinity of the four optical signal entering points 26 of the photoelectric converting portions 21 attached to the front and the back surfaces of the substrate 23. As shown in FIG. 11, the cable holding portion 30 has the four mirrors 31 and the four optical fibers 33 disposed therein. The lenses 22 and the mirrors 31 may be array lenses and array mirrors. As shown in FIG. 12, the connector portion 20 is configured to have the four optical signal entering points 26 and the centers of the four lenses 22 concentrically disposed centering a rotation center axis C' in parallel to the optical path between the connector portion 20 and the cable holding portion 30. On the other hand, the cable holding portion 30 has the four mirrors 31 concentrically disposed centering the rotation center axis C'. In the connector 150 in the seventh embodiment, the four optical signal entering points 26 and the four lenses 22 of the photoelectric converting portion 21 of the connector portion 20 are disposed facing the four mirrors 31 of the cable holding portion 30. The intersection points of, the contact plane (the rotation plane B-B') between the connector portion 20 and the cable holding portion 30, and four optical paths between the optical signal entering points 26 and the mirrors 31, are configured to be concentrically disposed centering the rotation center axis C'. Therefore, the four optical signal entering points 26 and the four lenses 22 in the connector portion 20 are disposed such that their positions face the positions of the four mirrors 31 of the cable holding portion 30 even when the connector portion 20 is rotated by a predetermined angle such as, for example, 90 degrees, 180 degrees, or 270 degrees.

According to the connector 150 of the seventh embodiment, the optical paths of the optical signals exiting from the four optical fibers 33 are bent at 90 degrees by the reflecting surfaces (the mirrors 31) at the end surfaces of the optical fibers 33. Thereafter, the optical signals are input into the photoelectric converting portions 21 mounted on the front and the back surfaces of the substrate 23 through the four lenses 22 facing the mirrors 31. The photoelectric converting portions 21 convert the optical signals into electric signals and output the electric signals from the terminal 11 to an external device.

In the seventh embodiment configured as above, the optical signals exiting from the optical fibers 33 are securely input into the optical signal entering points 26 of the photoelectric converting portions 21 even when the connector portion 20 is rotated by a predetermined angle such as, 90 degrees, 180 degrees, or 270 degrees relative to the cable holding portion 30. Therefore, seventh embodiment is configured to be able to increase the number of transmission lanes (the transmission paths). Though the transmission lanes are four in the seventh embodiment, the number of transmission lanes is not limited to four, and four or more transmission lanes may be employed, and three or two transmission lanes may be employed. In the seventh embodiment, similarly to the first to the sixth embodiments, the seventh embodiment may be configured to utilize lens coupling or coupling using the optical waveguide.

Figure 16:
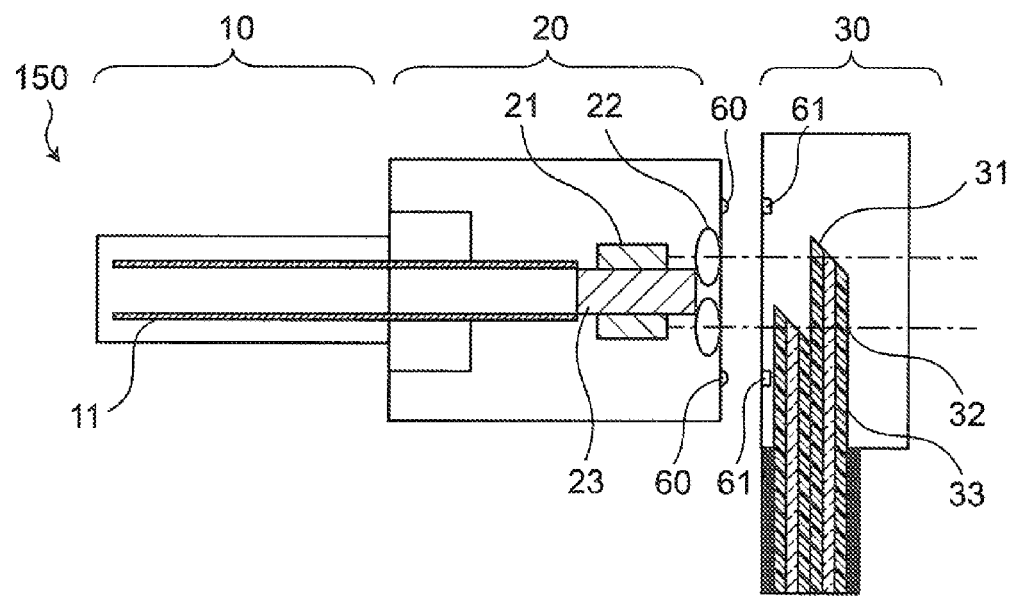
FIG. 16 is a diagram for explaining positioning members of the seventh embodiment according to the present disclosure.

In the seventh embodiment, the connector portion 20 is configured to be rotated by the predetermined angle relative to the cable holding portion 30 and, therefore, positioning members may be included (see FIG. 16). For example, the connector portion 20 is provided with a positioning protrusion 60, and the cable holding portion 30 is provided with a positioning recess 61 that engages with the positioning protrusion 60. The inclusion of the positioning members in this manner causes the positioning protrusion 60 to engage with the positioning recess 61 when the connector portion 20 is rotated and, thereby, the connector portion 20 can be held to be at the predetermined rotation angle relative to the cable holding portion 30. Preferably, the fit precision of the positioning protrusion 60 and the recess 61 is equal to or less than 10 μm and, thereby, the rotation is allowed without degrading the degree of the optical coupling between the lenses and the optical fibers.

Figure 13:
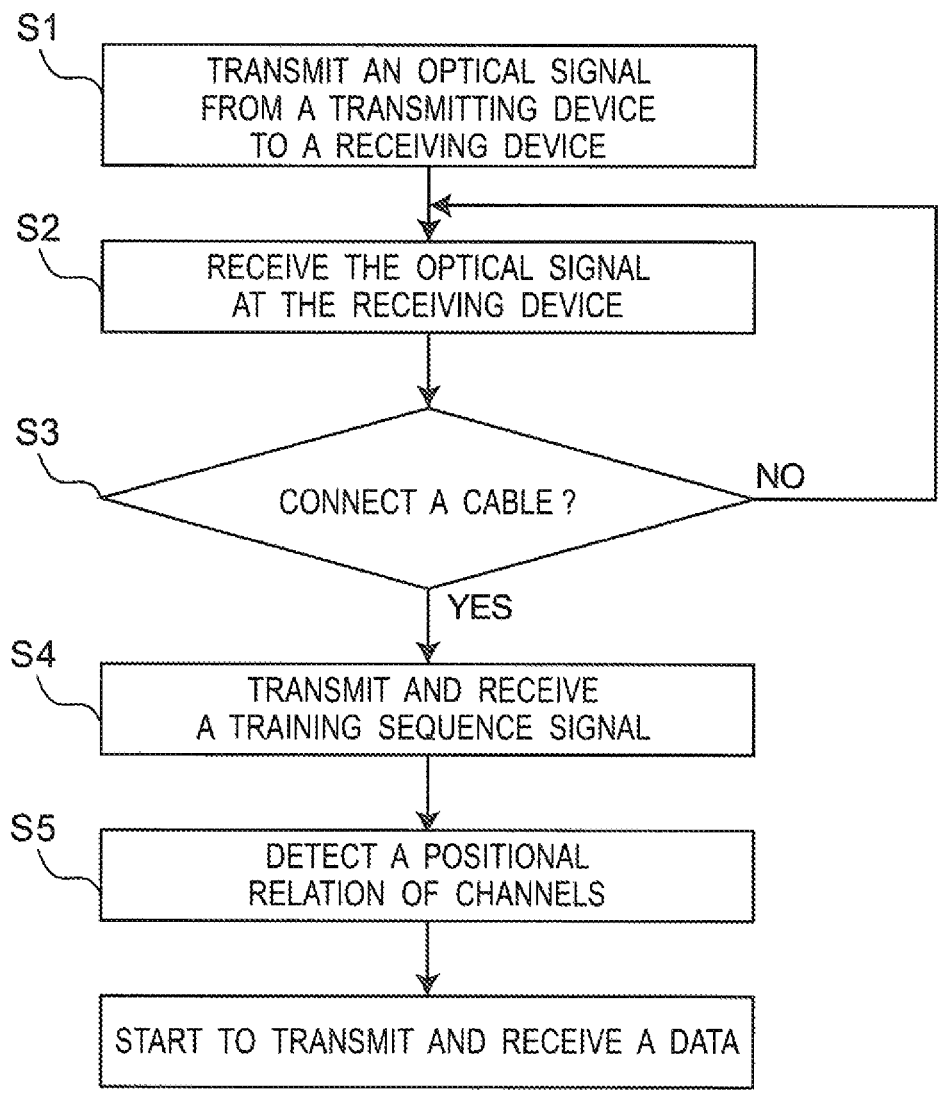
FIG. 13 is a training sequence flowchart in the seventh embodiment according to the present disclosure.

The seventh embodiment according to the present disclosure includes the plural transmission lanes and, therefore, in the initial connection stage of the connector 150, the correspondence of the signals of the transmission lanes may not be established between a video signal receiving device (hereinafter, "receiving device") and a video signal transmitting device (hereinafter, "transmitting device"). It is desirable to: check the signals in the plural transmission lanes when the power source is supplied, etc.; and establish the correspondence of the signals between the receiving and the transmitting devices. Therefore, the devices at the ends connected using the connectors 150 of the seventh embodiment may each be configured to execute a training sequence to establish the correspondence of the signals. In this case, the connector 150 and the connector on the other end are each configured to be able to transmit and receive the optical signals to transmit and receive a control signal for the training sequence. FIG. 13 is a training sequence flowchart for using the connector 150 of the seventh embodiment according to the present disclosure.

The training sequence is described with reference to the flowchart shown in FIG. 13.

(1) A cable provided with the connector 150 of the seventh embodiment as a receiving connector is connected to the transmitting device and the receiving device.

(2) The transmitting device generates an electric signal for checking the connection. A photoelectric converting portion of the transmitting connector converts the electric signal for checking the connection into an optical signal. The converted optical signal is transmitted to the receiving connector through the optical fiber 33 (step S1).

(3) The receiving connector receives the optical signal and the photoelectric converting portion 21 converts the optical signal into an electric signal (step S2).

(4) The converted electric signal is transmitted to the receiving device and the receiving device determines whether the receiving connector is connected to the receiving device, based on the received electric signal (step S3).

(5) When the receiving device determines that the receiving connector is not connected to the receiving device at step S3, step S2 is again repeated. This flow operation is executed at predetermined time intervals until the receiving connector is connected to the receiving device.

(6) When the receiving device determines that the receiving connector is connected to the receiving device at step S3, the receiving device transmits an electric signal to that effect to the transmitting device through the receiving connector, the optical fiber 33, and the transmitting connector. The transmitting device receives the electric signal informing of the establishment of the connection and generates a training sequence signal to identify the positional relation of the channels. The transmitting device transmits the training sequence signal to the receiving device through the transmitting connector, the optical fiber 33, and the receiving connector (step S4).

(7) The receiving device receives the training sequence signal and detects the positional relation (the correspondence relation) of the channels for the connection established by the rotation of the transmission lanes in the receiving connector, from the training sequence signal pattern (step S5).

(8) The receiving device interchanges the data channels based on the detected positional relation (the correspondence relation) of the channels and receives the electric signals. Thereby, the transmitting device can transmit data to the receiving device.

Figure 17:
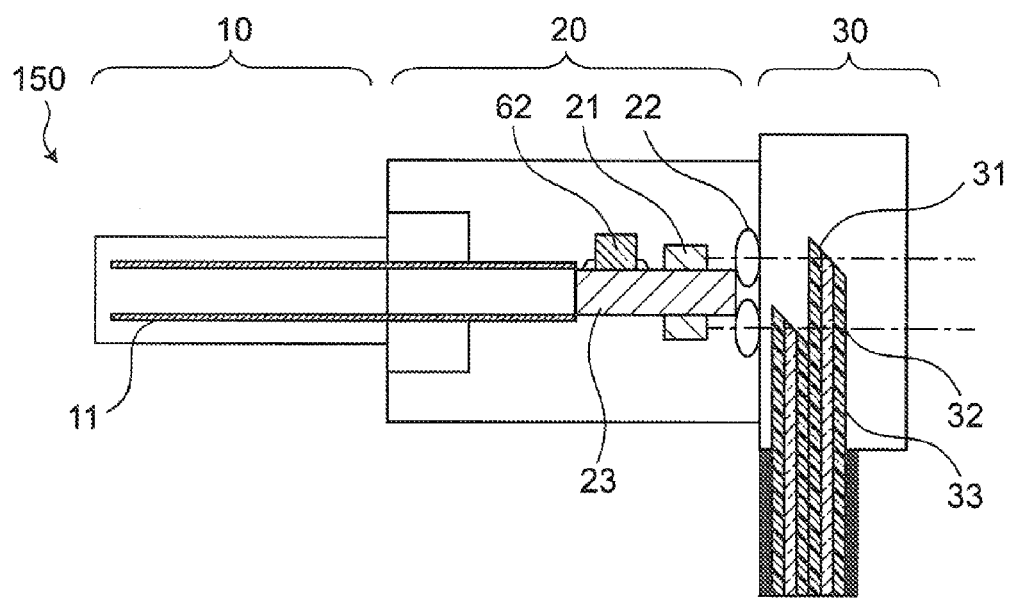
FIG. 17 is a diagram for explaining a training sequence control device (a micro computer, etc.) of the seventh embodiment according to the present disclosure.

A training sequence control device (such as a micro computer) 62 disposed in each of the transmitting connector and the receiving connector may execute the training sequence instead of the transmitting device and the receiving device (see FIG. 17). The connector 150 may be the transmitting connector. The connector disposed at the optical fiber end opposite to the connector 150 may be a straight type connector described later. In the flowchart of FIG. 13, the transmitting device and the receiving device may be replaced by each other. In this case, the training sequence control device 62 disposed in each of the transmitting connector and the receiving connector may also execute the training sequence instead of the transmitting device and the receiving device. Though FIG. 17 shows the only one training sequence control device 62, the plural training sequence control devices 62 may be disposed.

Figure 14A:
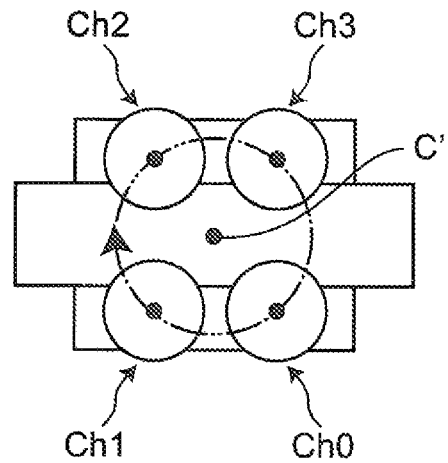
FIG. 14(*a*) is a positional relation diagram of transmission channels and receiving channels in a connection initial stage of a connection of the signal transmitting connector of the seventh embodiment according to the present disclosure.
Figure 14B:
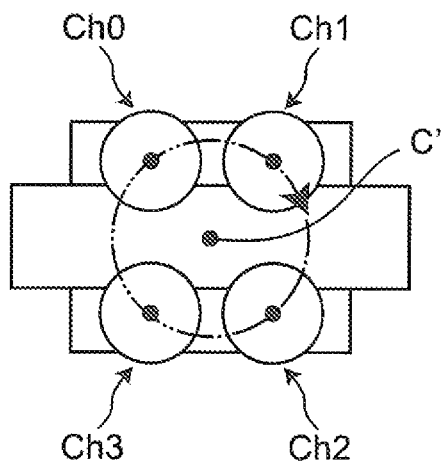

FIG. 14(a) is a diagram of the positional relation in the initial stage of the connection of the connector 150 between the thin-screen TV and the external device according to the connector 150 of the seventh embodiment according to the present disclosure. FIG. 14(b) is a diagram of the positional relation in the case where the correspondence of the channels is established between the transmitting side and the receiving side by the training sequence according to the connector 150 of the seventh embodiment according to the present disclosure. As shown in FIG. 14(a), in the case where the connector portion 20 according to the seventh embodiment is rotated and attached to the transmitting device, when the channels on the transmitting side and those on the receiving side do not correspond to each other, no data can be transmitted and received in the transmission lanes. In this case, the execution of the training sequence enables the establishment of the correspondence between the transmitting channels and the receiving channels as shown in FIG. 14(b), and data can be transmitted and received.

As above, according to the configuration of the seventh embodiment according to the present disclosure, the connector rotatable at predetermined angle intervals and capable of coping with any increase of the number of transmission lanes, and the cable using the connector can be provided. Even when the rotation of the connector 150 obstructs the establishment of the correspondence of the channels between the transmitting side and the receiving side, the execution of the training sequence can easily establish the correspondence of the channels between the transmitting side and the receiving side. Therefore, data can securely be transmitted and received in the plural transmission lanes even with the configuration having the devices connected by the cable provided with the connector 150 of the seventh embodiment.

Eighth Embodiment

Figure 15:
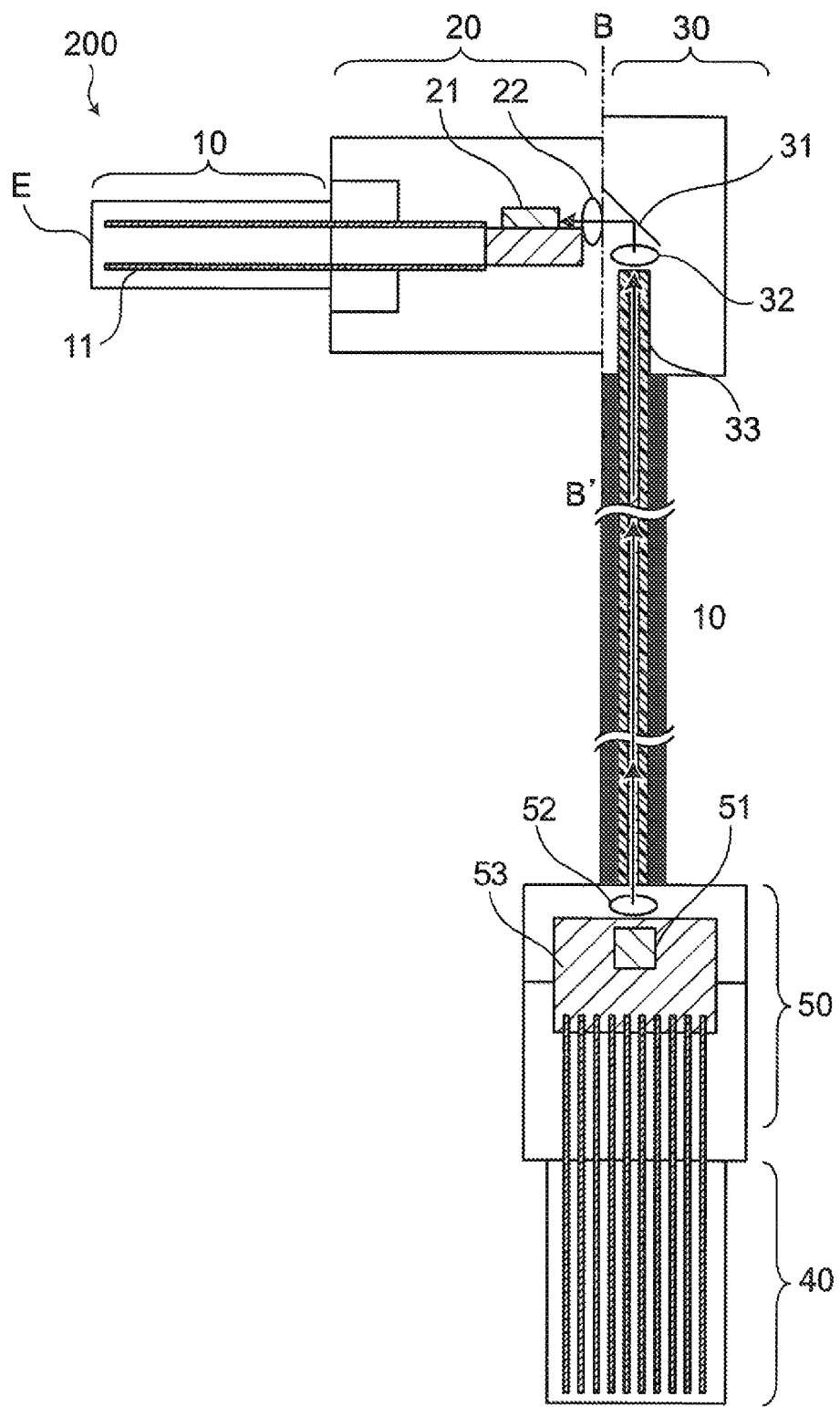
FIG. 15 is a schematic cross-sectional diagram of a structure of a cable of an eighth embodiment according to the present disclosure.

A cable of an eighth embodiment according to the present disclosure is described with reference to FIG. 15. FIG. 15 is a schematic cross-sectional diagram of a cable structure of the eighth embodiment according to the present disclosure. In the eighth embodiment, an end of a cable 200 is provided with any one of the connectors 1 and 100 to 150 of the first to the seventh embodiments. The other end of the cable 200 is provided with a straight type connector including a second connection terminal portion 40 and a second connector portion 50. The cable of the eighth embodiment includes the connectors disposed at the ends of the cable 200, and the optical fiber 33 forming the optical transmission path between the connectors at the ends. According to the specification, etc., of the device to be connected, any one of the connectors 1 and 100 to 150 of the first to the seventh embodiments may be used as the transmitting connector, and the straight type connector may be used as the receiving connector. Any one of the connectors 1 and 100 to 150 of the first to the seventh embodiments, and the straight type connector may also be used as the transmitting and receiving connectors. Any one of the connectors 1 and 100 to 150 of the first to the seventh embodiments may be disposed at each of the ends of the cable 200. The cable 200 of FIG. 15 shows an example where the connector 1 of the first embodiment is used as the receiving connector and the straight type connector is used as the transmitting connector. In the eighth embodiment, the description is made assuming that the connector 1 of the first embodiment is used as the receiving connector and the straight type connector is used as the transmitting connector.

According to the cable of the eighth embodiment, the configuration same as that of the connection terminal portion 10 of the first to the seventh embodiments is usable as the configuration of the second connection terminal portion 40.

The second connector portion 50 includes a second photoelectric converting portion 51. For example, an edge emitting laser or a surface emitting laser may be used as the second photoelectric converting portion 51. In the transmitting connector, an electric signal from an external device (a source device) enters the second photoelectric converting portion 51 from the terminal disposed on the second connection terminal 40 through a second substrate 53. The second photoelectric converting portion 51 converts the electric signal into an optical signal and outputs the optical signal. The optical signal is condensed by a second lens 52 and securely enters the optical fiber 33. On the other hand, in the receiving connector, the optical signal exiting from the optical fiber 33 has its optical path bent at 90 degrees by the mirror 31 and enters the photoelectric converting portion 21 through the lens 22. The photoelectric converting portion 21 converts the optical signal into an electric signal and the electric signal enters an external device (a sink device) from the terminal 11.

A silicon substrate can be used as the second substrate 53 similarly to the substrate 23 and the substrate 35. The use of the silicon substrate enables reduction of the difference in the thermal expansion coefficient between the substrate and the photodiode, and the mounting reliability can be enhanced. A ceramic substrate, a glass epoxy substrate having a low thermal expansion coefficient, or a Teflon (a registered trademark) substrate excellent in a high frequency property may be used as the second substrate 53.

As to the cable of the eighth embodiment, the connector on the end provided with the connector of any one of the first to the seventh embodiments may be connected to the sink apparatus to be the receiving device. For example, the connection to the connection terminal on the back surface of the thin-screen TV to be the sink apparatus enables the back surface of the thin-screen TV to be closer to the wall, etc.

As above, according to the eighth embodiment according to the present disclosure, the cable including the downsized connector can be realized. Thereby, for example, in the case where a thin-screen TV including a connection terminal on its back surface is mounted on the wall, even when a connector is inserted in the back surface of the thin-screen TV, the space can be reduced between the back surface of the thin-screen TV and the wall. The use of the cable of the eighth embodiment enables provision of a cable, for example, that does not degrade the appearance of the connector in the space on the back surface of the thin-screen TV and that does not apply any load with an excessive force to the connector.

The cable of the eighth embodiment may be bundled with the sink device such as a display apparatus, or the source device such as a video image output apparatus. The display apparatus can be, for example, a liquid crystal TV, and the configuration may be employed for the connection terminal of the liquid crystal TV to be connected to the connector of any one of the first to seventh embodiments, of the eighth embodiment. The video image output apparatus can be, for example, a Blu-ray disc player and the configuration may be employed for the connection terminal of the Blu-ray disc player to be connected to the straight type connector of the eighth embodiment.

In the present disclosure, the employment of the configuration to execute the signal transmission using the optical signal enables realization of the downsized signal transmitting connector. As a result, according to the present disclosure, for example, in the case where an apparatus including a connection terminal for signal transmission on its back surface is mounted on the wall and is used, even when the apparatus and an external device are connected to each other by the cable including the signal transmitting connector, the space between the back surface of the apparatus and the wall can be a small space offering no feeling of strangeness and no feeling of discomfort to users.

The present disclosure is described in a degree of detail in the embodiments. However, the content of the disclosure of these embodiments may naturally vary in the detailed configuration, and changes can be realized to the combination and order of elements in the embodiments without departing from the scope and the idea of claims.

Even when an apparatus including a connection terminal on its back surface is mounted on the wall and is used, the signal transmitting connector and the cable including the connector according to the present disclosure can reduce the space between the back surface of the apparatus and the wall, and are useful as a signal transmitting connector and a cable, by employing the configuration to execute signal transmission using an optical signal.

REFERENCE SIGNS LIST 1, 100, 110, 120, 130, 140, 150 connector
2, 200 cable
3 Blu-ray disc recorder
4 wall
5 thin-screen TV
10 connection terminal portion
11 terminal
20 connector portion
21 photoelectric converting portion
22 connector portion lens
23 connector portion substrate
24 connector portion mirror
25 connector portion optical waveguide
26 optical signal entering and exiting point
30 cable holding portion
31 cable holding portion mirror
32 cable holding portion lens
33 optical fiber
33a core portion
33b cladding portion
34 cable holding portion optical waveguide
35 cable holding portion substrate
36 optical fiber socket
40 second connection terminal portion
41 second terminal
50 second connector portion
51 second photoelectric converting portion
52 second lens
53 second substrate
60 positioning protrusion
61 positioning recess
62 training sequence control unit
C, C' rotation center axis
E end surface of the connection terminal portion (reference plane)

The invention claimed is:

1. A signal transmitting connector comprising:
   a connection terminal portion comprising a terminal that executes at least one of outputting of an electric signal to an external device or inputting of the electric signal from an external device;
   a connector portion comprising a photoelectric converting portion that executes photoelectric conversion between an optical signal and the electric signal; and
   a cable holding portion that holds an optical fiber transmitting the optical signal, the cable holding portion comprising a plurality of cable holding portion mirror each forming an optical path between the optical fiber and the photoelectric converting portion, wherein
   the connector portion is rotatably connected to the cable holding portion, wherein the connector is rotated around a rotation center axis in parallel to an optical path between the connector portion and the cable holding portion,
   the photoelectric converting portion comprises a plurality of optical signal entering points, wherein
   the plurality of cable holding portion mirrors are disposed to face the plurality of optical signal entering points of the photoelectric converting portion, and
   intersection points of, a contact plane between the connector portion and the cable holding portion, and a plurality of optical paths between the optical signal entering points and the plurality of cable holding portion mirrors, are concentrically disposed centering the rotation center axis.

2. The signal transmitting connector according to claim 1, wherein
   the photoelectric converting portion converts the optical signal from the cable holding portion mirror into an electric signal, and
   the terminal outputs the electric signal to an external device.

3. The signal transmitting connector according to claim 1, wherein
   the terminal inputs the electric signal from an external device, and
   the photoelectric converting portion converts the electric signal from the terminal into the optical signal.

4. The signal transmitting connector according to claim 3, wherein
   the photoelectric converting portion comprises an edge emitting laser.

5. The signal transmitting connector according to claim 3, wherein
   the photoelectric converting portion comprises a surface emitting laser.

6. The signal transmitting connector according to claim 1, wherein the cable holding portion mirror is configured to bend an optical path.

7. The signal transmitting connector according to claim 1, wherein
the connector portion comprises a connector portion lens in an optical path between the photoelectric converting portion and the cable holding portion mirror.

8. The signal transmitting connector according to claim 1, wherein
the cable holding portion comprises an optical fiber socket from which the optical fiber is detachable.

9. The signal transmitting connector according to claim 1, wherein
an end surface of the optical fiber is provided with a reflecting surface inclined by 45 degrees relative to an optical axis in the optical path between the connector portion and the cable holding portion.

10. The signal transmitting connector according to claim 1, wherein
the cable holding portion comprises a cable holding portion lens in an optical path between the cable holding portion mirror and the optical fiber.

11. The signal transmitting connector according to claim 1, wherein
the cable holding portion comprises a cable holding portion optical waveguide that forms an optical path together with the cable holding portion mirror.

12. The signal transmitting connector according to claim 1, wherein
the optical path between the photoelectric converting portion and the optical fiber is formed by a connector portion mirror, an optical waveguide, and the cable holding portion mirror.

13. The signal transmitting connector according to claim 1, wherein
a cross-section surface of the connection terminal portion which is cut perpendicular to a connection direction of the connection terminal portion has a non-circular shape.

14. A cable comprising:
an optical fiber; and
at least the one signal transmitting connector according to claim 1 disposed on an end of the optical fiber.

15. A display apparatus comprising:
a displaying portion that displays a video image;
a connection terminal to input thereinto an electric signal comprising a video signal; and
the cable according to claim 14 comprising the signal transmitting connector connected to the connection terminal.

16. A video signal output apparatus comprising:
a video signal generating portion that produces an electric signal comprising a video signal;
a connection terminal that outputs the electric signal from the video signal generating portion; and
a cable comprising an optical fiber, wherein
in the cable, the optical fiber has one end provided with at least the one signal transmitting connector according to claim 1, and the optical fiber has the other end provided with a second signal transmitting connector comprising a second connection terminal portion connected to the connection terminal, and a second photoelectric converting portion converting an electric signal from the connection terminal into an optical signal and outputting the optical signal to the optical fiber.

* * * * *